Dec. 18, 1934.     H. B. BROWN     1,984,825
THERMOMETER
Filed May 13, 1932
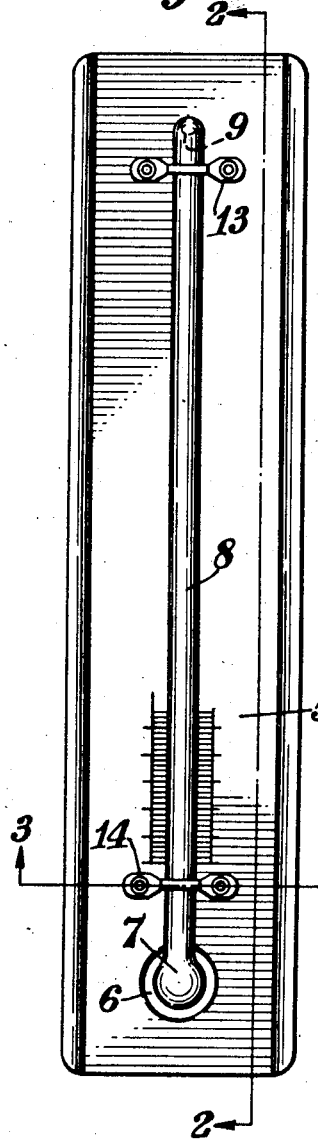
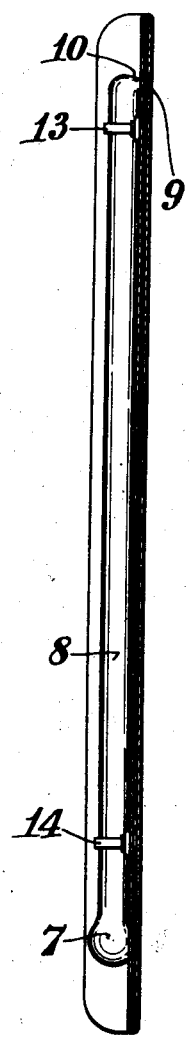
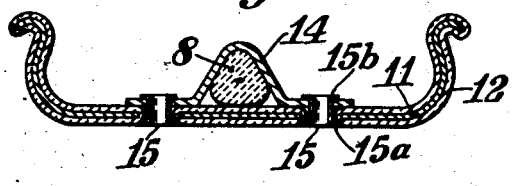
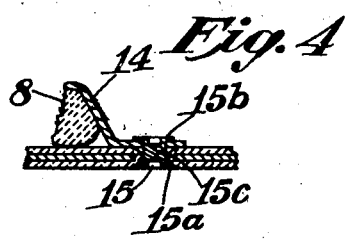
INVENTOR
H. Brainard Brown
BY D. Clyde Jones
ATTORNEY Patented Dec. 18, 1934

1,984,825

UNITED STATES PATENT OFFICE 1,984,825

THERMOMETER

H. Brainard Brown, Rochester, N. Y., assignor to Taylor Instrument Companies, Rochester, N. Y., a corporation of New York Application May 13, 1932, Serial No. 611,104

1 Claim. (Cl. 73—52)

This invention relates to thermometers and more particularly to an arrangement for attaching a thermometer tube to a thermometer back.

Much difficulty has been encountered in the past in securely fastening a thermometer tube to its back so that the proper fixed relation between the stem and the scale graduations on the back may be maintained. This is especially true in the case of thermometers used in cooking, the backs of which are usually covered with vitreous material so that they may be easily cleaned. It has been the former practice to fasten the stem-retaining clasps of such thermometers to the backs by means of small bolts and nuts, but since these thermometers are subjected to relatively high heat, there is a tendency for the nuts to become loosened in use. It has also been proposed to fasten the stems of such thermometers to the backs thereof by means of clips engaging the stems and having their ends passed through openings in the backs where they are bent into the plane of the backs. The use of such bolts, nuts and clips, however, has proved to be highly unsatisfactory, since they are difficult to clean and cleaning cloths catch on them, thereby causing them to become loosened so that the readings of the thermometers become inaccurate.

In accordance with the present invention a novel arrangement is provided for fastening a thermometer tube to a thermometer back in such a manner that there are no parts to become loose, that there are no exposed projections to catch cleaning cloths, and that there are no parts which are not easily cleaned.

A further feature of the invention resides in the use of hollow rivets for attaching stem clasps to thermometer backs whereby cracking of thermometer tubes and chipping of the vitreous backs are reduced to a negligible amount.

Referring to the drawing, Fig. 1 is a front elevation of a thermometer with its parts arranged according to the present invention; Fig. 2 is a vertical cross sectional view of the thermometer taken substantially on the line 2—2 of Fig. 1 looking in the direction of the arrows; Fig. 3 is a cross sectional view of the thermometer taken on the line 3—3 of Fig. 1 likewise looking in the direction of the arrows; and Fig. 4 is a fragmentary sectional view illustrating a modified form of attaching means.

In the drawing, 5 generally designates a metal thermometer back having a bulb opening 6 near its lower end to receive a portion of the bulb 7 of thermometer tube 8, and having near its upper end, a hook opening 9 to receive the glass retaining hook 10 of the thermometer tube. As shown in the sectional views of Figs. 2 and 3, the thermometer back is preferably formed from a piece of sheet metal 11 entirely coated with a layer of vitreous enamel 12. The stem of the tube 8 is securely held on the thermometer back 5 by stem clasps 13 and 14 mounted respectively near the upper and the lower ends of the stem. Each of these clasps is firmly anchored to the back by hollow rivets such as 15 extending through registering openings in the back and in the stem clasps in which position they are riveted. Since the stem of the thermometer tube 8 is of glass and since the back 5 is coated with a fragile vitreous layer 12, it becomes a difficult problem to anchor the stem clasps to the without cracking the stem and without chipping the vitreous layers. The head 15a of each rivet preferably rests in the tapered opening in the back where the vitreous layer 12 flows away from the edge of the opening in the metal strip 11. The body of the rivet, however, extends through the opening in the stem clasp which acts as a washer against which the free end of the rivet is peened over as shown at 15b. It will be understood that in peening the end of the rivet, its head is placed on the flat surface of a fixture (not shown) and the clasp serves to distribute the pressure exerted against the vitreous layer during the peening of the free end of each rivet, so that chipping of the vitreous enamel is avoided.

In the modified form of attachment shown in Fig. 4, the rivet 15 is hollow only at its ends, while its intermediate portion 15c is solid. However, the term "hollow rivet" as used in the description and claim is intended to cover both forms as illustrated in detail in Figs. 3 and 4.

When the clasps are thus riveted in position, it is practically impossible to loosen them so that a permanent, accurate reading of the thermometer is assured. Since the ends of the rivets lie close to the surface of the clasps and back, there are no exposed projections which are difficult to clean and on which cleaning cloths can catch.

I claim:

In a thermometer, a vitreous enamel back, a thermometer tube, said back having pairs of openings at each side of said tube, the edges of said openings being tapered, a plurality of clasps engaging the front of said tube, the ends of said clasps having openings in registry with the openings in said back, and hollow rivets extending through the openings in registry, the head of each rivet being substantially coplanar with the rear surface of said back and being in engagement with the vitreous covering at the tapered edges of the openings in said back and the other end of said rivet being peened against the material of the clasp as a washer.

H. BRAINARD BROWN.